(12) United States Patent
Spinnato

(10) Patent No.: US 6,749,535 B2
(45) Date of Patent: Jun. 15, 2004

(54) ACCELERATION CONTROL AND RELEASE DEVICE

(75) Inventor: Dario Spinnato, Rome (IT)

(73) Assignees: Sistema Guida 2000 s.r.l., Rome (IT); Guidosimplex s.n.c. di Giancarlo Venturini e C., Rome (IT)

(*) Notice: Subject to any disclaimer, the term of this patent is extended or adjusted under 35 U.S.C. 154(b) by 0 days.

(21) Appl. No.: 10/434,178

(22) Filed: May 9, 2003

(65) Prior Publication Data
US 2003/0195085 A1 Oct. 16, 2003

Related U.S. Application Data

(63) Continuation-in-part of application No. 09/720,455, filed as application No. PCT/IT99/00190 on Jun. 25, 1999, now abandoned.

(30) Foreign Application Priority Data
Jun. 26, 1998 (IT) ........................................ RM98A0429

(51) Int. Cl.[7] .............................. B60K 41/20; B60T 7/08
(52) U.S. Cl. .................... 477/209; 74/477 XY; 74/524; 74/482
(58) Field of Search ..................... 74/471 R, 477 XY, 74/481, 482, 502.2, 524, 489, 469, 496; 280/188; 477/209

(56) References Cited

U.S. PATENT DOCUMENTS

| | | | |
|---|---|---|---|
| 2,523,491 A | 9/1950 | Auten | |
| 2,602,348 A | * 7/1952 | Wilson | ...................... 74/471 R |
| 2,731,850 A | 1/1956 | Otto | |
| 2,777,335 A | 1/1957 | Engber et al. | |
| 2,855,797 A | * 10/1958 | Dunn | .......................... 74/482 |
| 2,875,638 A | 3/1959 | Sell | |
| 2,899,835 A | * 8/1959 | Moreland | ..................... 74/481 |
| 4,436,191 A | 3/1984 | Perry | |
| 4,627,522 A | 12/1986 | Ulrich et al. | |
| 4,879,922 A | 11/1989 | Suzuki | |
| 4,946,013 A | 8/1990 | Conlyn et al. | |
| 4,993,509 A | 2/1991 | Howell | |
| 4,998,983 A | 3/1991 | Ruprecht et al. | |
| 5,103,946 A | 4/1992 | Masters et al. | |
| 5,129,492 A | * 7/1992 | Lenz et al. | .................... 74/481 |
| 5,934,146 A | 8/1999 | Richard | |

FOREIGN PATENT DOCUMENTS

| | | |
|---|---|---|
| AU | 663460 | 10/1995 |
| EP | 0 139 082 | 5/1985 |
| EP | 0 297 671 | 1/1989 |
| GB | 2 290 509 | 1/1996 |

* cited by examiner

Primary Examiner—Richard M. Lorence
Assistant Examiner—Eric M. Williams
(74) Attorney, Agent, or Firm—Young & Thompson

(57) ABSTRACT

A vehicle acceleration control and release device operatively connectable to a vehicle acceleration device, includes a device body; a lever operatively connected to the device body and pivotable about a first axis for controlling vehicle acceleration and pivotable about a second axis for releasing acceleration control, the first axis being perpendicular to the second axis.

16 Claims, 3 Drawing Sheets

ACCELERATION CONTROL AND RELEASE DEVICE

This application is a continuation-in-part of application Ser. No. 09/720,455, filed on Feb. 26, 2001 and now abandoned. Application Ser. No. 09/720,455 is the national phase of PCT International Application No. PCT/IT99/00190 filed on Jun. 25, 1999 under 35 USC 371. The entire contents of each of the above-identified applications are hereby incorporated by reference.

BACKGROUND OF THE INVENTION

The present invention relates to an acceleration control and release device for hand control of vehicle acceleration and positive release of a vehicle accelerator for braking.

More specifically, the invention relates to such a device employed in the automotive field. The inventive device allows a driver to avoid continued acceleration action during a braking operation.

DESCRIPTION OF THE RELATED ART

The problem of automatically releasing the accelerator during a braking operation is very important in many technical fields, but is particularly important in apparatuses designed for allowing disabled persons to drive.

At present, acceleration and braking devices for disabled persons are known. Such prior art devices comprise a handle connected to a pivoted lever mounted under the steering member of a motor vehicle or on the floor of the vehicle.

However, these prior art devices do not allow for the automatic cancellation of the acceleration when braking. In fact, in the case the acceleration handle is not manually, either completely or partially, reset so as to discontinue acceleration, an unavoidable and dangerous interference occurs due to the braking and acceleration actions being active at the same time. This problem can occur for example during emergency maneuvering. Having the vehicle attempt to simultaneously accelerate and brake can render the braking action ineffective.

AU 663460 describes a hand control system for motor vehicles, which is the closest known prior art for the present invention.

SUMMARY OF THE INVENTION

A main object of the present invention is solving prior art drawbacks by ensuring that the vehicle does not attempt to simultaneously accelerate and brake. That is, the present invention provides a technical solution for vehicle control with acceleration and braking being independent.

Another object of the present invention is avoiding possible interference when switching from acceleration to braking action.

It is therefore a specific object of the present invention to provide a device for automatic release of acceleration when a braking action is begun, wherein a vehicle acceleration device, e.g., fuel system to fuel injectors, is operatively connected to the inventive device, e.g., through an accelerator cable and the inventive device includes a pivoted lever for use in both acceleration and braking by movement of the lever in different and substantially perpendicular directions.

An object of the invention is to provide a device including a cruise control device.

BRIEF DESCRIPTION OF THE DRAWINGS

The present invention will now be described, for illustrative but not limitative purposes, according to its preferred embodiments, with particular reference to the figures of the enclosed drawings, wherein.

DESCRIPTION OF THE PREFERRED EMBODIMENTS

Figure 1:
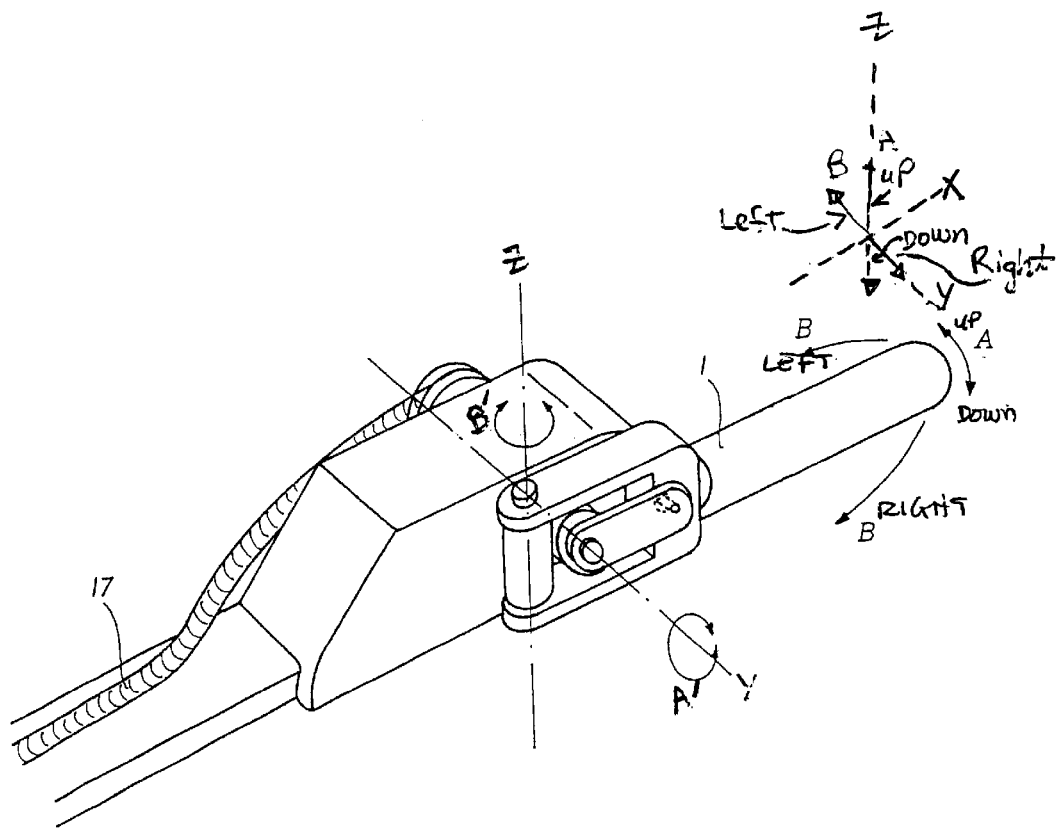
FIG. 1 is a schematic perspective view of a first embodiment according to the invention.
Figure 2:
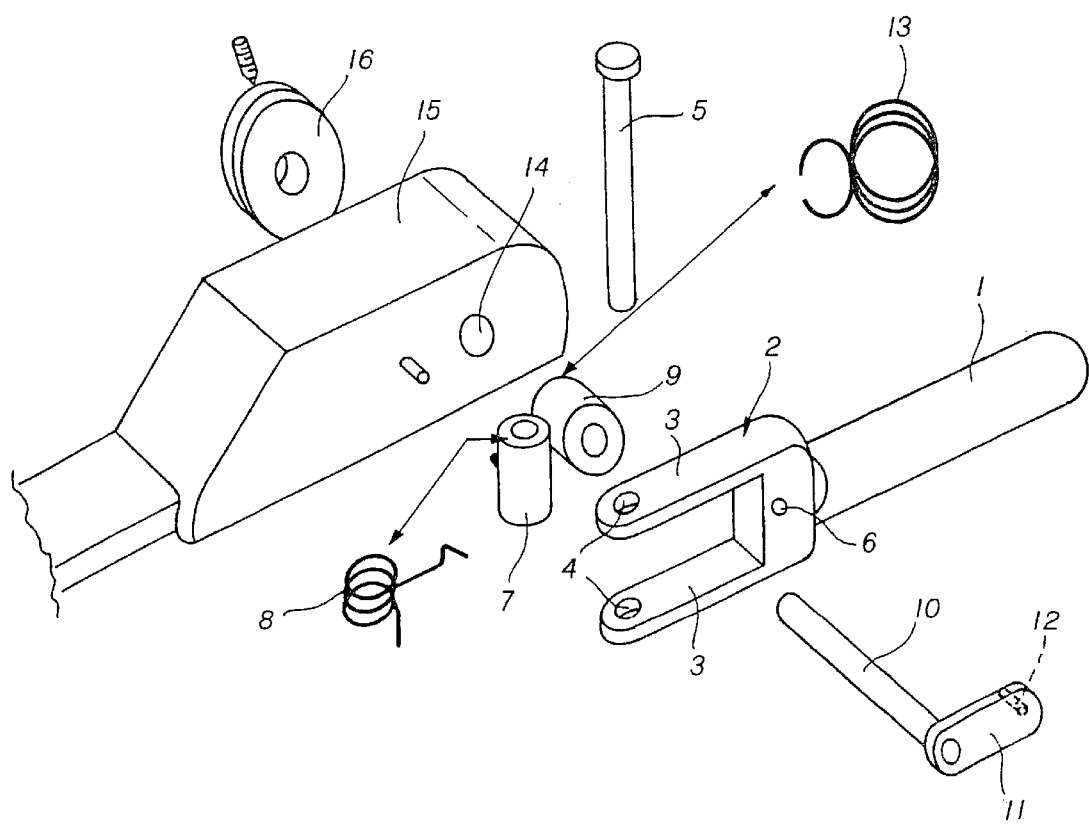
FIG. 2 is an exploded view of the device of FIG. 1.

Making reference to FIGS. 1 and 2, the device of the invention is an acceleration control assembly to allow driving by disabled persons, in this case particularly, but not exclusively, for tetraplegic persons.

FIGS. 1 and 2 show a pivotable lever 1 which the driver uses to both accelerate and to release acceleration when braking.

See in FIG. 1 that the present vehicle acceleration control and release device is operatively connectable to a vehicle acceleration device (e.g., a fuel injection control system or the like) via an accelerator cable 17. The device includes a lever 1 pivotable about a first axis Y (see circle A') for controlling vehicle acceleration and pivotable about a second axis Z (see circle B') for releasing acceleration control. The first axis Y is perpendicular to the second axis Z.

A driver would grasp the lever 1 with her hand and apply a first force to move the lever in a slight arc upward to increase pressure against an acceleration cable and call for acceleration. Increased pressure on the acceleration cable would cause the vehicle to accelerate while decreasing pressure on the cable would cause the vehicle to decelerate. In this way, the upward and downward movement of the lever corresponds to varying pressure on a vehicle accelerator pedal.

The upward and downward directions are shown in FIG. 1 by arrows A, which corresponds generally to movement in a Z axis of an X-Y-Z system.

The device includes a pulley 16 mounted perpendicular to the first axis Y, the pulley having a connection 23 for connecting to the accelerator cable 17 and, via a force applied by the pulley to the accelerator cable, to the vehicle acceleration device. Connecting elements connecting the pulley to the lever and rotating the pulley in common with movement of the lever are discussed below. This arrangement thus acts as a means for interfacing with the vehicle acceleration device.

The device operates such that with no force applied by a driver to the lever, the lever and the pulley rest in a neutral position calling for no acceleration from the vehicle acceleration device with no force being applied by the pulley on the accelerator cable, whereas when the driver applies the first force in a first direction (upward as shown by arrow A in the positive X axis direction) to the lever to cause the lever to move from the neutral position and pivot about the first axis, the pulley is pivoted to create a force on the accelerator cable and call for acceleration from the vehicle acceleration device.

Advantageously, when the lever is out of the neutral position and the driver applies a second force in a second direction perpendicular to the first direction and toward the pulley (as shown by left arrow B in the negative Y axis direction), the pulley is automatically returned to the neutral position so that the pulley calls for no acceleration from the vehicle acceleration device.

As discussed below, the connecting elements releasably connect the pulley 16 to the lever 1 and, when connecting the pulley to the lever, rotate the pulley in common with movement of the lever. The first force being applied in the upward direction on the lever causes the lever to pivot about the first axis Y and also causes the pulley to rotate about the first axis Y, the rotation of the pulley creating a force on the accelerator cable 17 calling for acceleration from the vehicle acceleration device.

Advantageously, when the pulley 16 is out of the neutral position, i.e., when calling for acceleration, the second force in the second direction perpendicular to the first direction and toward the pulley, causes the connecting elements to disconnect the pulley from the lever and return the pulley to the neutral position. See that a longitudinal axis of the second axis Z rotates about the first axis Y when the lever 1 and the pulley 16 are out of the neutral position. While rotating about the first axis, the second axis maintains a perpendicular relationship to the first axis.

With reference to FIG. 1, there is shown an acceleration cable 17. Acceleration cable 17 is connected to pulley 16 (shown in FIG. 2).

Pulley 16 is connected to a first end of pin 10 by setting element 20. A second end of pin 10 is connected to plate 11. See that plate 11 has a relief 12.

The pin 10 is mounted through hole 14 of device body 15.

The lever 1 terminates with a forked end 2 having two arms 3 and blind hole 6. The free ends of arms 3 include holes 4.

Pin 10 extends through the opening formed by forked end 2 and through hole 14. During acceleration, relief 12 engages into blind hole 6.

When relief 12 is engaged into blind hole 6, upward and downward movement of lever 1 by the driver is translated via plate 11 through pin 10 and pulley 16 to the accelerator cable 17, causing acceleration and deceleration. When pin 10 and connected plate 11 and pulley 16 are in a neutral position, the acceleration cable is also in a neutral mode where there is no action on the acceleration device of the vehicle. The neutral position is equivalent of taking one's foot off the vehicle accelerator pedal.

Sleeve 7 is mounted between holes 4 by pin 5. Additionally, a first hindering spring 8 is mounted between an upper surface end of sleeve 7 and an upper arm 3 by inserted pin 5. The first hindering spring biases fork 3 against plate 11 in order to secure relief 12 in blind hole 6 and to hinder the disconnection of the plate 11 from the lever 1.

A second hindering spring 13 is mounted coaxially to sleeve 9 to hinder (resist) the movement of lever 1 against motion in the direction of arrow A and to return pulley 16 to the neutral position. That is, the spring 13 biases the lever to the neutral position, serving as an automatic return-to-neutral (no call for acceleration) position feature. The major portion of second hindering spring 13 (the right hand portion as shown in FIG. 2) is mounted coaxially around sleeve 9 and the minor portion of second hindering spring 13 (the left hand portion as shown in FIG. 2) is mounted coaxially around sleeve 7. In this way, second hindering spring 13 provides a resistance to the driver's upward movement of lever 1, biasing the lever in the downward direction of arrow A.

During acceleration, the driver acts on lever 1 to move the lever's extreme end in an upward or downward direction as shown by arrow A. Relief 12 is engaged within blind hole 6, so that the upward or downward movement of the lever's end translates to circular movement of pulley 16 as illustrated by circle A' of FIG. 1. The circular movement of pulley 16 acts on acceleration cable 17 to cause acceleration or deceleration.

The lever can also be moved in a left direction by the driver as shown by left arrow B of FIG. 1, which generally corresponds to movement in the Y axis of an X-Y-Z system. Arrows B are exaggerated and movement to the left and right would describe a limited arc. Movement in the direction of arrows B (to the left and right) causes lever 1 to pivot about pin 5 in a circular manner as shown by circle B' in FIG. 1. Spring 8 biases the lever to the right as shown by right arrow B, allowing the relief to engage the blind hole.

When the driver desires to brake, the driver acts on lever 1 to move and hold the lever to the left accordingly to left arrow B. Movement of lever 1 to the left causes relief 12 to be pulled out of blind hole 6; that is, relief 12 is released from blind hole 6. Upon relief 12 being released from blind hole 6, second hindering spring 13 causes pin 10, together with connected plate 11 and pulley 16, to move to the neutral position so that no action on the acceleration device of the vehicle. In this way, the vehicle does not accelerate when braking, overcoming disadvantages of the prior art described above.

Once the driver has completed breaking, lever 1 is allowed to return to the right encouraged by first hindering spring 8 so that relief 12 is engaged in blind hole 6. At this point, the driver can move lever 1 upward or downward as per arrow A for acceleration or deceleration.

As already mentioned, the device according to the invention can be realized with modifications which are included in the normal knowledge of one skilled in the art.

For example, pin 10 and plate 11 could be replaced by different parts for interaction with the acceleration device via the acceleration cable 17.

Furthermore, pulley 16 could be replaced by a different part for communicating movement of lever 1 with the vehicle acceleration device.

Figure 3:
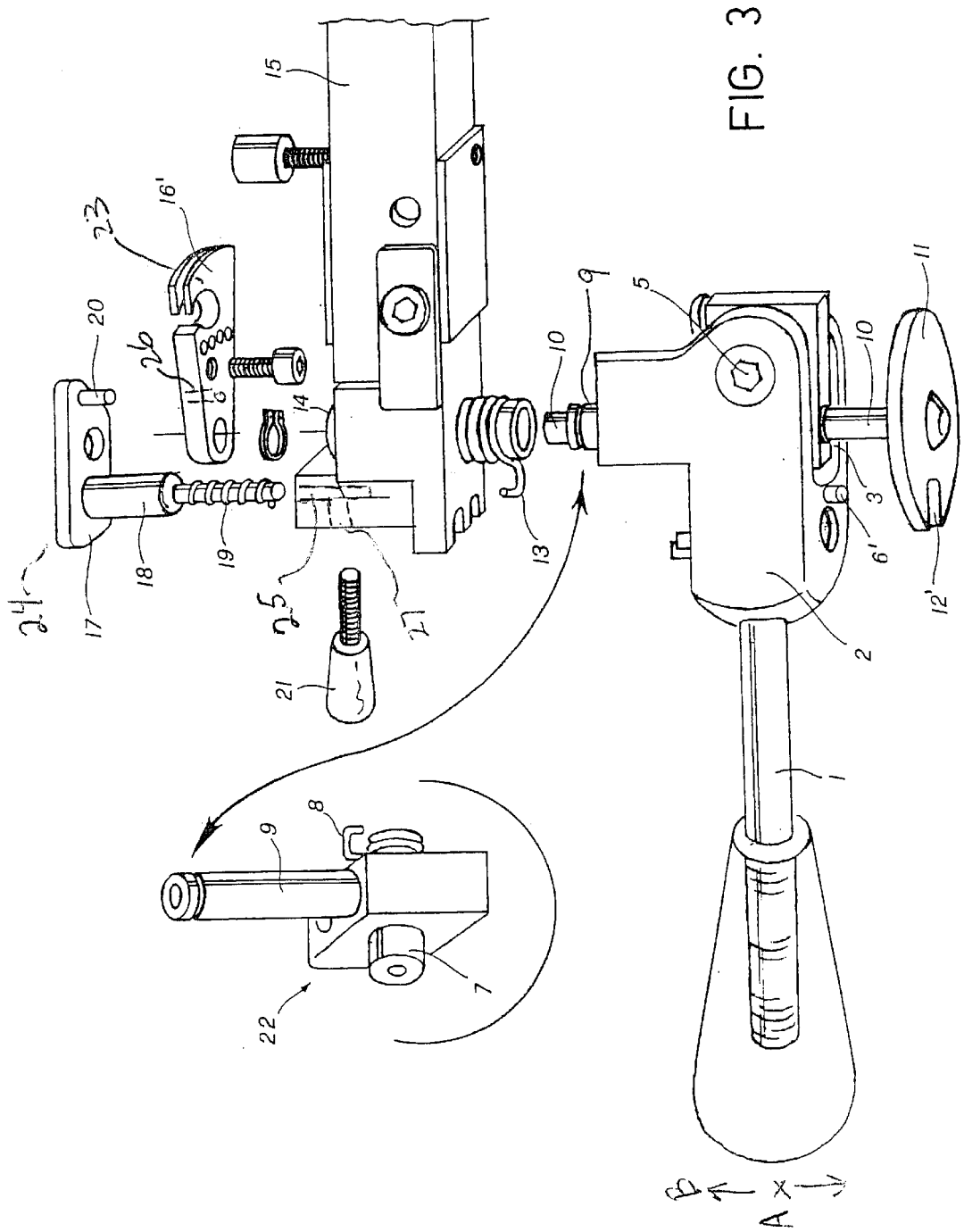
FIG. 3 is an exploded view of a second embodiment of the invention.

FIG. 3 shows a second embodiment of the invention.

The second embodiment is substantially equal to the first embodiment, so that corresponding parts will be indicated by the same references. Substantially, the main difference between the two embodiments is that the second embodiment is designed for a left-handed driver and includes a speed control device.

Lever 1 is used during acceleration and braking.

Lever 1 ends with U-shaped fork element 2 having two arms 3. Pin 5 extends through holes 4 located at the free ends of arms 3.

On the body of fork element 2, a pin 6' is provided.

Pin 5 retains, within an open end of fork element 2, element assembly 22, shown in the enlarged particular of FIG. 3. Element assembly 22 comprises two sleeves 7 and 9. Element assembly 22 further comprises first hindering spring 8 mounted on sleeve 7.

Pin 10 passes through sleeve 9. Plate 11 is attached to one end of pin 10. Plate 11 includes a notch 12' engaging with peg 6' to releasably secure plate 11 to forked element 2.

Coaxial to sleeve 9 is second hindering spring 13 set to resist acceleration movement of lever 1. As shown in FIG. 3, arrow A would be into and out of the paper illustrating the device and arrows B would be up and down along the paper surface.

Pin 10 passes through hole 14 in body 15. Plate 16' is connected to pin 10. As shown, plate 16' can be a pulley.

Plate 16' includes a retaining element 23 for connection to accelerator cable 17 (shown in FIGS. 1–2).

A cruise control device 17 is also mounted to body 15. The cruise control device 24 comprises plate 17 mounted on pin 18. Also mounted on pin 18 is spring 19. Pin 18 is mounted in hole 25 of body 15.

Pin 20 mounted on plate 17 engages into hole 26 of plate 16'. Laterally, a knob 21 is mounted through slot 27 to be tightened against and hold pin 18 in place. If the driver wishes to use the cruise control device 24, she will tighten knob 21, holding pin 18 and plate 17 in place. Pin 20 engaged with hole 26 in turn holds plate 16' in place. Plate 16' in turn holds accelerator cable 17 in place until the driver acts to accelerator or brake.

The present invention has been described for illustrative but not limitative purposes, according to its preferred embodiments, but it is to be understood that modifications and/or changes can be introduced by those skilled in the art without departing from the relevant scope of the invention.

What is claimed is:

1. A vehicle acceleration control and release device operatively connectable to a vehicle acceleration device, comprising:
    a device body;
    a lever operatively connected to the device body and pivotable about a first axis for controlling vehicle acceleration and pivotable about a second axis for releasing acceleration control,
    the first axis being perpendicular to the second axis.

2. The control device of claim 1, further comprising:
    a pulley mounted perpendicular to the first axis, the pulley having a connection for connecting to an accelerator cable and, via a force applied by the pulley to the accelerator cable, to the vehicle acceleration device; and
    connecting elements connecting the pulley to the lever and rotating the pulley in common with movement of the lever, wherein,
        with no force applied by a driver to the lever, the lever and the pulley rest in a neutral position calling for no acceleration from the vehicle acceleration device with no force being applied by the pulley on the accelerator cable,
        when the driver applies a first force in a first direction to the lever to cause the lever to move from the neutral position and pivot about the first axis, the pulley is pivoted to create a force on the accelerator cable and call for acceleration from the vehicle acceleration device, and
        when the lever is out of the neutral position and the driver applies a second force in a second direction perpendicular to the first direction and toward the pulley, the pulley is automatically returned to the neutral position so that the pulley calls for no acceleration from the vehicle acceleration device.

3. The control device of claim 2, wherein,
    the connecting elements comprise
        a pin, the pulley being connected to a first end of the pin,
        a plate connected to a second end of the pin, and
        a relief extending from the plate;
    the device body comprises a hole,
    the pin being mounted through the hole of the device body;
    the lever terminating at one end with a forked end having two arms and a blind hole, the ends of said arms including holes,
    the pin extending through an opening formed by the forked end and through the hole of the device body,
    when the driver applies the first force in the first direction to the lever to cause the lever to move from the neutral position and pivot about the first axis, the relief engages into the blind hole,
    with the relief engaged into the blind hole, upward and downward movements of the lever translated via the plate through the pin and the pulley to the accelerator cable, causing acceleration and deceleration.

4. The control device of claim 3, wherein,
    the connecting elements further comprise
        a first sleeve mounted between the holes of the fork arms,
        a sleeve pin retaining the first sleeve within the fork arms, and
        a first hindering spring mounted between an upper surface end of the first sleeve and an upper arm of the forked end, the first hindering spring biasing the forked end against the plate to engage the relief in the blind hole.

5. The control device of claim 4, wherein,
    the connecting elements further comprise
        a second sleeve mounted on the pin between the device body and the plate, and
        a second hindering spring mounted coaxially to second sleeve biasing movement of the lever toward the neutral position.

6. The control device of claim 2, wherein,
    the connecting elements comprise
        a pin, the pulley being connected to a first end of the pin,
        a plate connected to a second end of the pin, and
        a notch (12') located in the plate;
    the device body comprises a relief (6'),
    the pin being mounted through the hole of the device body;
    the lever terminating at one end with a forked end having two arms and a blind hole, the ends of said arms including holes,
    the pin extending through an opening formed by the forked end and through the hole of the device body,
    when the driver applies the first force in the first direction to the lever to cause the lever to move from the neutral position and pivot about the first axis, the relief engages into the notch, with the relief engaged into the notch, upward and downward movements of the lever translated via the plate through the pin and the pulley to the accelerator cable, causing acceleration and deceleration.

7. The control device of claim 6, wherein,
    the connecting elements further comprise
        a first sleeve mounted between the holes of the fork arms,
        a sleeve pin retaining the first sleeve within the fork arms, and
        a first hindering spring mounted between an end of the first sleeve and an arm of the forked end, the first hindering spring biasing the forked end against the plate to engage the relief in the notch.

8. The control device of claim 7, wherein,
    the connecting elements further comprise
        a second sleeve mounted around the pin between the device body and the plate, and
        a second hindering spring mounted coaxially to second sleeve biasing movement of the lever toward the neutral position.

9. The control device of claim 1, further comprising:

a pulley mounted perpendicular to the first axis, the pulley having a connection for connecting to an accelerator cable and, via a force applied by the pulley to the accelerator cable, to the vehicle acceleration device; and connecting elements releasably connecting the pulley to the lever and rotating the pulley in common with movement of the lever, wherein, with no force applied to the lever, the pulley and lever rest in a neutral position calling for no acceleration from the vehicle acceleration device, a first force applied in a first direction to the lever causes the lever to pivot about the first axis and causes the pulley to rotate about the first axis, the rotation of the pulley creating a force on the accelerator cable calling for acceleration from the vehicle acceleration device, with the pulley out of the neutral position, a second force in a second direction perpendicular to the first direction and toward the pulley, causes the connecting elements to disconnect the pulley from the lever and return the pulley to the neutral position, and with the lever out of the neutral position, the second axis rotates about the first axis while maintaining a perpendicular relationship to the first axis.

10. A device for automatic release of the acceleration during a braking action, comprising:

interfacing means (16) for interfacing with a vehicle acceleration device;

lever means (1) for an acceleration action to control acceleration and for a braking action to release acceleration for braking, the acceleration action occurring from a force applied to the lever means in a first direction (A) and the braking action occurring from a force applied to the lever means in a second direction (B) substantially perpendicular to the first direction, coupling means (10, 11) for integrally coupling of the interfacing means with the lever means, the coupling means including releasable coupling means (6, 12) for releasably connecting the lever means to the interfacing means, the releasable coupling means including a hindering spring (8) biasing the coupling means into a coupling position; and return elastic means (13) biasing the lever means to return to the acceleration device to a neutral position.

11. The device according to claim 10, wherein the lever means (1) comprises a forked end with two arms, the hindering spring (8) being mounted at ends of the two arms (3).

12. The device according to claim 11, wherein, the releasable coupling means comprises a plate provided with a relief, the relief normally engaging a blind hole within the lever means, and during the braking action occurring from the force applied to the lever means in the second direction (B) substantially perpendicular to the first direction, the relief (12) provided on the plate (11), decouples from the blind hole to release the interfacing means from the lever means.

13. An acceleration device, comprising:

an accelerator pulley;

a lever coupled with said accelerator pulley, said lever to control acceleration and release acceleration for braking, the control of acceleration and the release of acceleration for braking occurring according to substantially perpendicular movements of said lever;

a coupler coupling said lever with said accelerator pulley;

a connector releasably disconnecting and connecting said coupler to said lever;

a first spring hindering the releasable disconnecting of said coupler from said lever; and a second spring for returning said accelerator pulley to a neutral position.

14. The device according to claim 13, wherein said coupler comprises a pin, said pin having on one end a plate releasably coupled with said lever.

15. The device according to claim 13, wherein said lever is provided on one end with a two arm fork, at the ends of said arms said first spring is mounted.

16. The device according to claim 14, further comprising a relief provided on said plate, the relief coupling with a blind hole in said lever, to releasably couple the plate to the lever.

* * * * *